RECORD MEDIUM HANDLING IN HEAT-WRITING RECORDING OSCILLOGRAPHS

Filed Sept. 30, 1966

INVENTOR.
JOSEPH JOHN NEFF

BY Christie, Parker & Hale
ATTORNEYS 3,389,401
Patented June 18, 1968

3,389,401

RECORD MEDIUM HANDLING IN HEAT-WRITING RECORDING OSCILLOGRAPHS

Joseph John Neff, Pasadena, Calif., assignor to Consolidated Electrodynamics Corporation, Pasadena, Calif., a corporation of California Continuation-in-part of application Ser. No. 530,524, Feb. 28, 1966. This application Sept. 30, 1966, Ser. No. 583,343
6 Claims. (Cl. 346—76)

ABSTRACT OF THE DISCLOSURE

A heat-writing recording oscillograph in which a strip of recording medium is stored in a supply roll with an obverse side thereof inwardly of the coil and which, in passage to a writing edge, is dragged over a surface which is stationary relative to the edge, engages the rear surface of the medium, and is curved convex toward the medium for conditioning the medium before it reaches the writing edge so that the medium conforms closely to the contour of the writing edge.

This application is a continuation-in-part of application Ser. No. 530,524, filed Feb. 28, 1966, for Oscillograph Loading.

This invention relates to heat-writing recording oscillographs, also known as strip chart recorders. More particularly, it relates to the handling of the record medium in such devices to provide fine recorded traces of the time-variations of input signals to the devices, and to provide uniform trace density across the width of the strip of recording medium.

In any recording oscillograph it is desired that the time-variations of oscillograph input signals be manifested upon the appropriate recording medium as fine trace lines, regardless of whether the oscillograph is a light-writing device, an ink-writing device, or a heat-writing device. If the trace line is too heavy, the signal trace will be unintelligible with respect to the recordings of intermediate and high frequency, intermediate and high amplitude input signals because, in such cases, the velocity of the writing mechanism (be it a moving light spot, a heated stylus, or an ink pen) relative to the medium is high and the trace of one excursion of the writing mechanism will overlie and mask the trace of the preceding excursion. Accordingly, some practical compromise between the trace fineness optimum for low writing speeds and the trace fineness optimum for high writing speeds is in order in any oscillograph intended for use with a wide spectrum of input signal frequencies and amplitudes.

The problem of providing a readable trace in a wide-frequency range heat-writing oscillograph has long been troublesome. The writing stylus must be quite hot, preferably incandescent, to provide sufficient medium heating when moving at high velocities relative to the medium. A stylus heated to incandescence, however, can easily burn out the medium at low stylus velocities. It is, therefore, necessary, particularly with respect to low writing speeds, to assure that the contact between the stylus and the medium is minimized.

This invention provides for the handling of a thermo-sensitive record medium in a heat-writing oscillograph in such a manner that the amount of contact between the medium and the heated stylus is held to a minimum. Thus, the stylus can be heated to incandescence so as to produce a legible trace at high writing speeds, yet the contact between the medium and the stylus is sufficiently small that the stylus does not unduly burn the medium at low writing speeds of the stylus relative to the medium.

Generally speaking, this invention resides in an improvement in a heat-writing recording oscillograph. The oscillograph includes a heated stylus which is engageable with an obverse side of a strip of thermo-sensitive recording medium, the medium being movable along a selected path in the oscillograph. The stylus is laterally movable of the medium path of movement. The improvement is in means providing minimum writing contact between the stylus and the medium and, in terms of apparatus, includes a medium conditioning member for engaging the reverse side of the medium. The member is disposed up-path from stylus and defines a portion of the path. The member has a surface curved convex toward the reverse side of the medium. The invention also includes means opposite the stylus and down the path from the surface which defines a writing edge forming a sharp corner in the path, the obverse side of the medium being curved convex away from the writing edge at the corner. The writing edge extends transversely of the path of record movement. Also included are means for moving the medium in tension over the surface and the writing edge. The stylus is biased toward engagement with the writing edge. The medium, in moving over the convex surface, is conditioned so that as it passes over the writing edge, the corner in the path is readily produced. The stylus engages the obverse surface of the medium at the corner.

The above-mentioned and other features of the invention are more fully set forth in the following description of the structure and operation of a presently preferred embodiment of the invention, the description being presented with reference to the accompanying drawings, wherein.

Figures 2, 3:
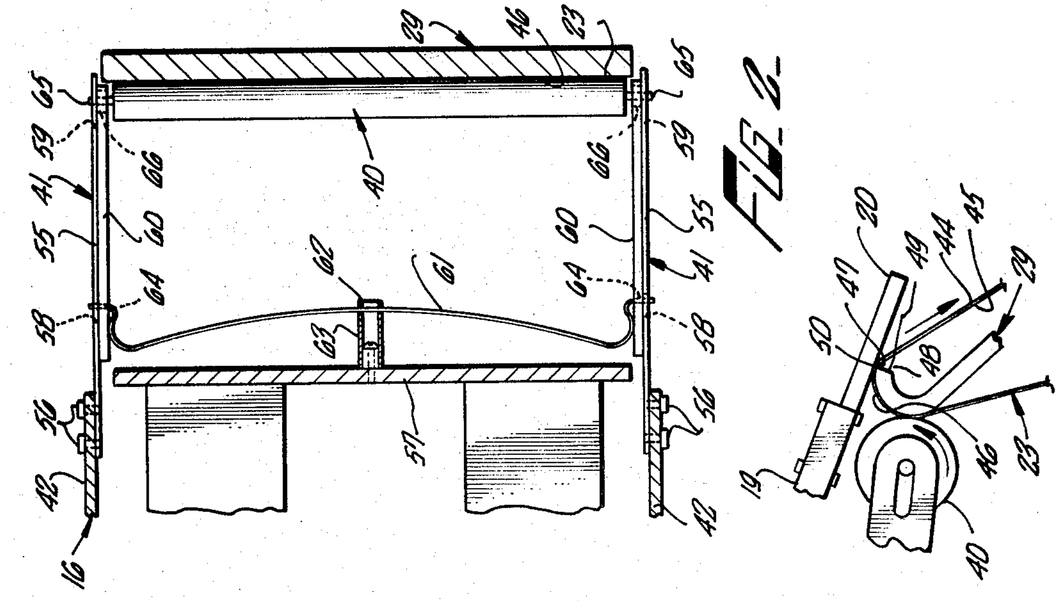
FIG. 2 is an enlarged cross-sectional elevation view of the oscillograph at and adjacent the location of writing contact of the stylus with the record medium.
FIG. 3 is an enlarged cross-sectional view taken along line 3—3 of FIG. 1.

A heat-writing mechanical oscillograph 10 includes a housing frame 11 having a pair of spaced end plates 12, only one of which is shown. An access door 13 is hingeably mounted at its upper end to a frame by a hinge pin 14. The door is disposed in its closed position when the oscillograph is operated for the purpose of recording graphic representations of the variations in an oscillograph input signal. The door is disposed in its open position when it is desired to insert a fresh supply roll of recording paper into the instrument.

A bank of aligned stylus drive motors 15 (only one of which is visible in FIG. 1) is located in the upper rear portion of the housing. The stylus drive motors are mounted to a motor mounting bracket 16. Each stylus drive motor has a rotatable output shaft 17 which extends generally upwardly from the motor to a hub 18 of a stylus support arm 19. The motor shafts are aligned parallel to each other. Each stylus arm extends normal to its motor drive shaft toward door 13. At its end remote from its supporting drive motor shaft, each stylus support arm carries a stylus 20. Each stylus is comprised of a pair of concentric tubular sleeves mounted in cantilever fashion from the unsupported end of arm 19, as shown in FIG. 2. The supported ends of the sleeves are coupled to respective ones of a pair of stylus energizing electrical conductors 21 connected to the supported end of arm 19 from a terminal block 22. The unsupported ends of the sleeves are conductively interconnected, but the sleeves are otherwise insulated from each other. When a suitable potential is applied across the supported ends of the sleeves, the sleeves heat to incandescence. Contact of the stylus with a thermo-sensitive record paper 23 produces a mark on the paper as the paper is moved past the stylus.

Figure 1:
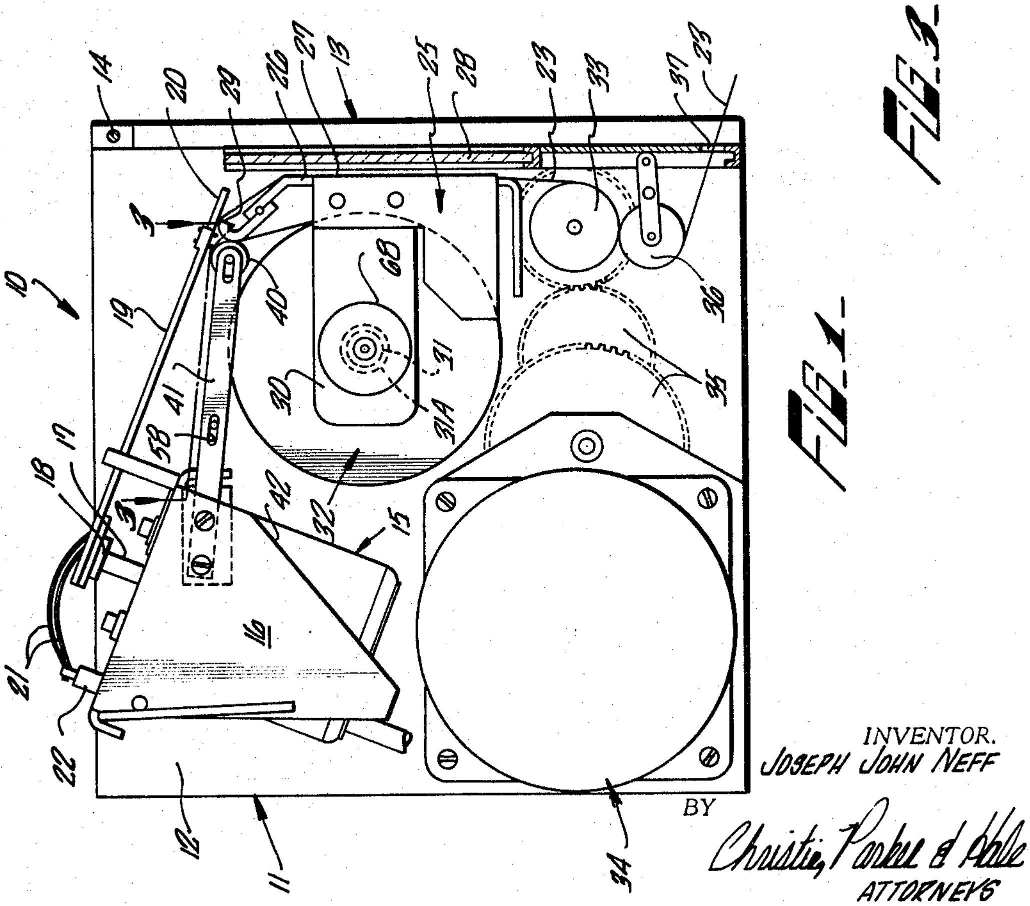
FIG. 1 is a side elevation view of a heat-writing recording oscillograph.

A platen assembly 25 is disposed in the housing adjacent the closed position of door 13. The platen assembly includes a platen 26 having a planar surface 27 which, when the oscillograph is operating and the door is closed, lies parallel to and adjacent to the inner surface of the door opposite a viewing window 28 carried by the door. At its upper end, the platen is bent away from surface 27 and, as shown in FIG. 1, terminates in a record medium conditioning member 29, shown in greater detail in FIG. 2.

A pair of brackets 30 are mounted to the platen at its opposite ends adjacent the frame end plates and extend away from platen surface 27. Each bracket, at a location spaced from the platen, rotatably mounts a respective one of a pair of coaxially aligned record supply roll holder pins 31. The pins are sized to fit snugly without slippage into a core 31A of a record paper supply roll 32. The supply roll is rotatable about an axis parallel to the conditioning member and to writing edge 47, described below.

A record paper drive roller 33 is rotatably mounted between the frame end plates below the platen assembly adjacent the closed position of door 13. The drive roller is driven by a motor 34 via a gear train 35 so that a length of record paper engaged with the roller is pulled from supply roll 32 over member 29, and over surface 27, to the drive roller during operation of the oscillograph. In order that the record paper may be properly engaged with the drive roller during operation of the oscillograph, a pressure roller 36 is rotatably mounted to the inner surface of the door in such position that the pressure roller is moved into cooperative engagement with the drive roller when the door is closed. The pressure roller is resiliently biased toward the drive roller. Record paper moved along the above-described path in the oscillograph passes from between the pressure and drive rollers through an exit slot 37 in the lower portion of the door.

A record paper drag roller 40 is rotatably mounted between a pair of arm assemblies 41 which extend forwardly in the housing from motor bracket end flanges 42. The drag roller is disposed adjacent the record conditioning member during operation of the oscillograph and is resiliently biased to force paper passing between it and the conditioning member into engagement with the conditioning member. This cooperation between the drag roller and the conditioning member causes the strip of record paper between the drag and drive rollers to be under a selected amount of tension between the drag roller and the drive roller. The tension in the moving strip of record paper between the drag and drive rollers is essentially constant since the amount of platen assembly surface engaged by the strip is essentially constant regardless of the degree of fullness of the paper supply roll.

Record paper 23 has an obverse or active side 44 which is treated to be thermo-sensitive; the paper also has an opposite untreated reverse side 45. Normally, the record paper is formed into supply roll 32 in such a manner that the obverse side of the paper faces the axis of the roll. A quantity of record paper may be kept for some time in the form of a supply roll before it is used. The longer the time the paper is kept rolled tightly, the more difficult it becomes, when the paper is used in oscillograph 10, because of the tendency of the paper to return to its rolled state, to cause the paper to follow exactly along the desired path of paper movement through the device. If uniform traces of the desired fineness are to be imparted to the paper by stylus 20, the paper must follow exactly the desired path as it moves past the stylus. Member 29 is arranged to condition the record paper leaving supply roll 32 so that the paper deviates minimally from the desired path at the point of writing contact between the stylus and the paper.

Record conditioning member 29 extends across the entire width of paper strip 23 at a location in the oscillograph between the supply roll and the stylus. The member is aligned normal to the direction of strip movement through the oscillograph. As shown in FIG. 2, the conditioning member has a surface 46, extending along the length of the member transversely of the path of strip movement, which is curved convex toward the reverse side of the strip of record paper. This surface is referred to herein as a "curling surface" and has a small radius of curvature relative to the radius of supply roll core 31A. The conditioning member is so positioned in the oscillograph on platen 26 that drag roller 40 is located adjacent surface 46, toward the supply roll, at the beginning of the curvature of the surface. The end of the curvature of the curling surface opposite from the drag roller is defined by a writing edge 47 of the oscillograph. The writing edge is formed by sharply relieving the conditioning member, as at 48, from the path of record paper movement in a direction away from stylus 20. In effect, the writing edge is a sharp corner defined by the intersection of surface 46 with the end 49 of the member opposite from platen 26; if the corner has any radius of curvature at all, such radius is very small relative to the radius of curvature of the curling surface. It should be understood, however, that curling surface 46 and writing edge 47 may be defined by separate structural elements or by spatially separated portions of a single element without departing from the scope of the invention.

The record paper is pulled by drive roll 33 from supply roll 32 between the curling surface and the drag roller, the drag roller being resiliently biased toward the conditioning member. The path of paper movement through the oscillograph is arranged so that the reverse side of the paper slides in intimate frictional engagement with the curling surface over the surface between the drag roller and writing edge 47. Because the amount of contact between the paper and the curling surface is constant, the tension in the paper at the writing edge is constant. In moving from the drag roller to the writing edge, the paper is caused to follow a curvature which is opposite to the curvature imposed upon the paper while stored in the supply roll. As noted, the radius of curvature of the curling surface is relatively small relative to the radius of the supply roll core. Thus, as the paper moves over the curling surface, it is conditioned to follow as closely as possible the desired path of paper movement at the writing edge. In effect, the back of the paper is broken by surface 46 so that the paper becomes pliable and its tendency to return to its supply roll curvature is neutralized. Accordingly, as the paper path turns the corner 50 formed in the path at the writing edge because of the tension developed in the paper by the time it reaches the writing edge, the paper follows the desired sharp corner 50 in its path of movement.

Stylus 20 is urged toward the writing edge by means of the mounting of stylus support arm 19 to motor shaft hub 18. The longitudinal axis of the stylus is aligned so as to be essentially normal to a line bisecting the included angle of paper path corner 50. As a result, the stylus makes essentially point contact with the obverse side of the paper on the outer surface of the corner and produces a fine trace on the paper.

Stylus drive motor 15 is operated in response to variations in the value of an oscillograph input signal to drive the stylus along the writing edge a proportional amount laterally of the path of record paper movement, thereby to produce on the record paper a graphic representation of time-variations in the input signal. It is desired that the recorded trace be of essentially uniform density throughout its extent, and not heavier in some places than in others. Thus, the conformance of the record paper to the desired path, i.e., corner 50, at all locations along the writing edge is desired. Since the desired conformance is produced by maintenance in the paper of the desired tension at the writing edge, the forcefulness of the engagement of the drag roller with conditioning member 29 should be uniform along the length of the drag roller.

To maintain the tension in the record paper uniform across the length of writing edge 47, drag roller 40 is mounted to the stylus motor bracket by the structure shown in FIG. 3. Each drag roller mounting arm assembly 41 includes a guide arm 55 which is rigidly mounted to a corresponding one of bracket flanges 42 by screws 56. A flange 57 extends downwardly from the motor bracket between arms 55 adjacent the front edges of flanges 42. Forwardly of flange 57, each arm 55 defines an elongate slot 58 (see FIG. 1) aligned with the length of the arm; a similar slot 59 is formed in each arm adjacent its end remote from the stylus motor bracket. A movable arm member 60 is slidably engaged with each of the opposing surfaces of arms 55 forward of flange 57. A spring rod 61 is supported at its midlength between arm members 60 in a diametral slot 62 formed in the forward end of a spring support sleeve 63 mounted at its rear end to bracket flange 57. Each end of the spring rod extends through a circular aperture 64 formed in the rear portion of a corresponding arm member 60 into sliding engagement with adjacent slot 58. The drag roller has coaxially aligned axles 65 which are rotatably mounted in bearings 66 carried by arm members 60 at their forward ends. Each drag roller axle extends beyond its bearing into engagement with an adjacent slot 59. Accordingly, the drag roller is mounted for limited sliding movement toward and away from bracket flange 57, but is urged into engagement with curling surface 46 of the conditioning member by spring 61.

Because only a single spring is used and because the spring is supported at essentially a single point at its midlength, equal forces are imposed on axles 65 and the pressure of the drag roller against a strip of record paper disposed between it and curling surface 46 is equal across the width of the paper. As a result, the friction produced between the roller and writing edge 47 along surface 46 is uniform across the width of the strip and the angle with which the paper breaks over the writing edge is sharp, and uniform across the width of the strip. Thus, the stylus engages the record paper at only a single sharply defined point along the writing edge and the trace provided by the stylus is uniform regardless of the position of the stylus transversely of the path of paper movement.

Also, because of the manner in which the drag roller is mounted and biased toward surface 46, the advantages described above are obtained even though the operational position of the platen assembly relative to the stylus motor bracket may change slightly during the life of the oscillograph.

What is claimed is:

1. In a heat-writing recording oscillograph in which a strip of thermosensitive record medium is moved along a selected path from a supply roll wherein the medium is coiled with an obverse side thereof concave to the center of the roll for engagement of the reverse side of the medium with means defining a writing edge forming a sharp corner in the path at which the curvature of the obverse side of the medium is convex away from the writing edge, and in which a heated stylus is engageable with the obverse side of the medium at the corner, the stylus being movable laterally of the path along the writing edge, the improvement in means providing minimum writing contact between the medium and the stylus at the writing edge comprising a medium conditioning member disposed up-path from the writing edge between the writing edge and the supply roll for engaging the reverse side of the medium and defining a portion of the path, the conditioning member having a surface curved convex toward the medium reverse side and which is stationary relative to the writing edge so that the medium slides over the surface during operation of the oscillograph, and means for moving the medium in tension over both the surface in intimate engagement therewith and the writing edge.

2. Apparatus according to claim 1 wherein the writing edge is defined by the conditioning member as a boundary of said curved surface.

3. Apparatus according to claim 1 including means engaged with the medium adjacent the conditioning member along the path opposite from the writing edge for maintaining the tension in the strip at the writing edge uniform along the edge.

4. Apparatus according to claim 1 wherein the supply roll has a cylindrical core upon which the strip of record medium is coiled, and the surface of the conditioning member has a radius of curvature which is less than that of the supply roll core.

5. In a heat-writing recording oscillograph including a heated stylus engageable with an obverse side of a strip of thermosensitive record medium movable along a selected path in the oscillograph, the stylus being movable laterally of said path, the improvement in means providing minimum writing contact between the medium and the stylus comprising a medium conditioning member for engaging the reverse side of the medium disposed up-path from the stylus and defining a portion of said path, the conditioning member having a stationary surface curved convex toward the medium reverse side and over which the medium slides during movement of the medium along said path, means opposite the stylus and down the path from the surface defining a writing edge extending transversely of the path and defining a sharp corner in the path at which the curvature of the obverse side of the medium is convex away from the writing edge, means for moving the medium in tension both over the surface in intimate engagement therewith and over the edge, the stylus being biased toward engagement with the writing edge, and a rotatable drag roller disposed in spaced parallel relation to the writing edge and biased into engagement with said curved surface for maintaining constant throughout operation of the oscillograph the wrap of the strip of record medium around said curved surface.

6. In a heat-writing recording oscillograph including a heated stylus engageable with an obverse side of a strip of thermosensitive record medium movable along a selected path in the oscillograph, the stylus being movable laterally of said path, the improvement in means providing minimum writing contact between the medium and the stylus comprising a medium conditioning member for engaging the reverse side of the medium disposed up-path from the stylus and defining a portion of said path, the conditioning member having a stationary surface curved convex toward the medium reverse side and over which the medium slides during movement of the medium along said path, means opposite the stylus and down the path from the surface defining a writing edge extending transversely of the path and defining a sharp corner in the path at which the curvature of the obverse side of the medium is convex away from the writing edge, means for moving the medium in tension both over the surface in intimate engagement therewith and over the edge, the stylus being biased toward engagement with the writing edge, a rotatable drag roller disposed in spaced parallel relation to the writing edge and biased into engagement with said curved surface for maintaining constant throughout operation of the oscillograph the wrap of the strip of record medium around said curved surface, means for biasing the drag roller toward the conditioning member surface so that the force of engagement of the drag roller with the curved surface is essentially uniform along the length of the drag roller including a single elongate spring rod coupled to the opposite ends of the drag roller, and means supporting the spring rod at substantially a single point essentially midway between the ends of the spring rod.

References Cited

UNITED STATES PATENTS 3,082,970 3/1963 Rasmussen ----------- 346—76

RICHARD B. WILKINSON, *Primary Examiner.*

E. C. SIMMONS, *Assistant Examiner.*